Oct. 25, 1932.  1,884,579
E. S. CORNELIUSSEN, CALLED CORNELL ET AL
ELECTRIC STATION
Filed Dec. 19, 1928    3 Sheets-Sheet 1
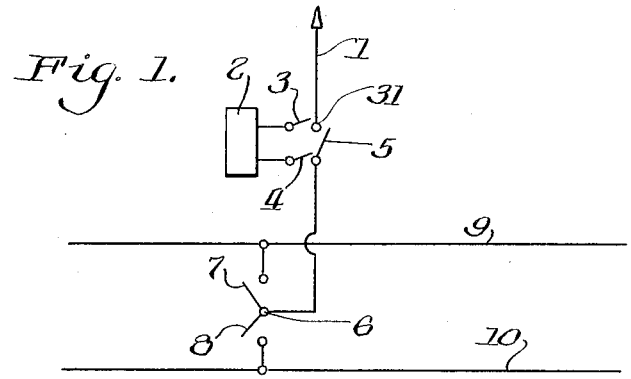
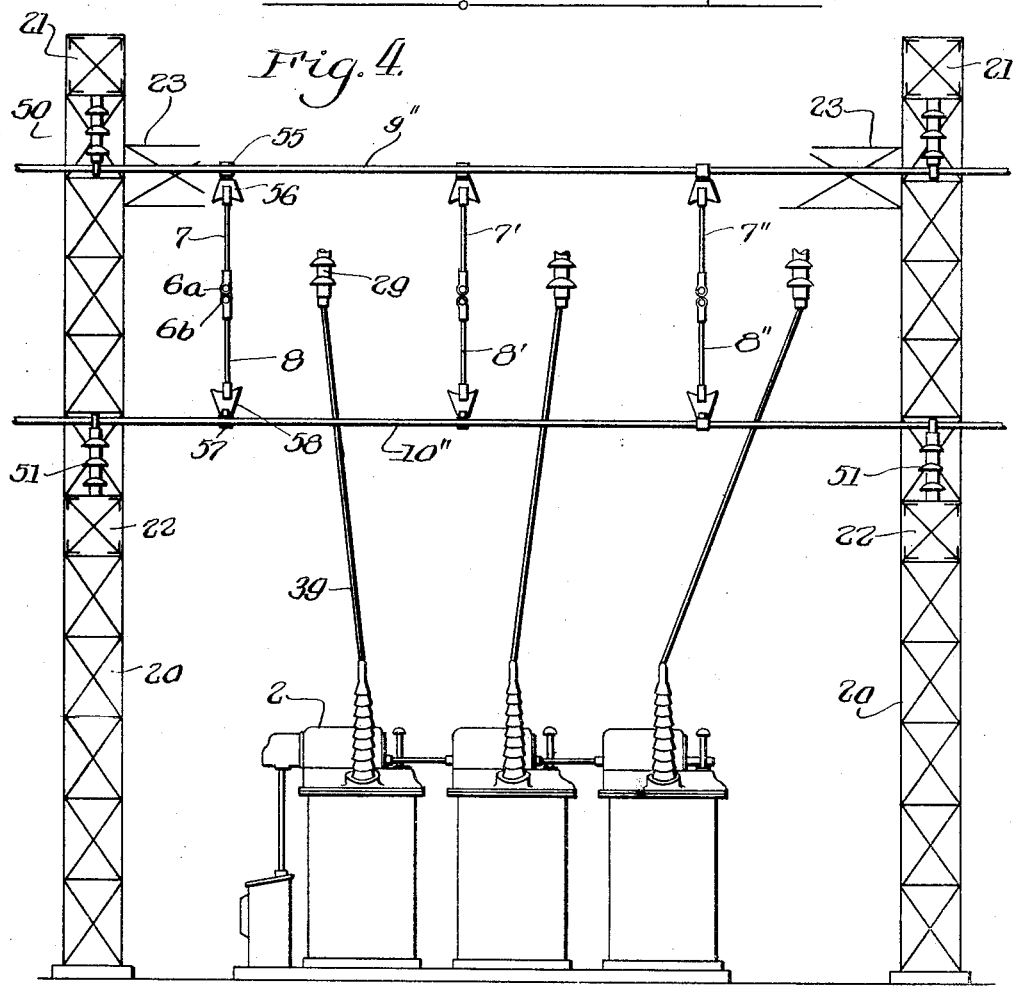
Inventors:
Elias S. Corneliussen
Henry D. Freitag and Philip Sporn

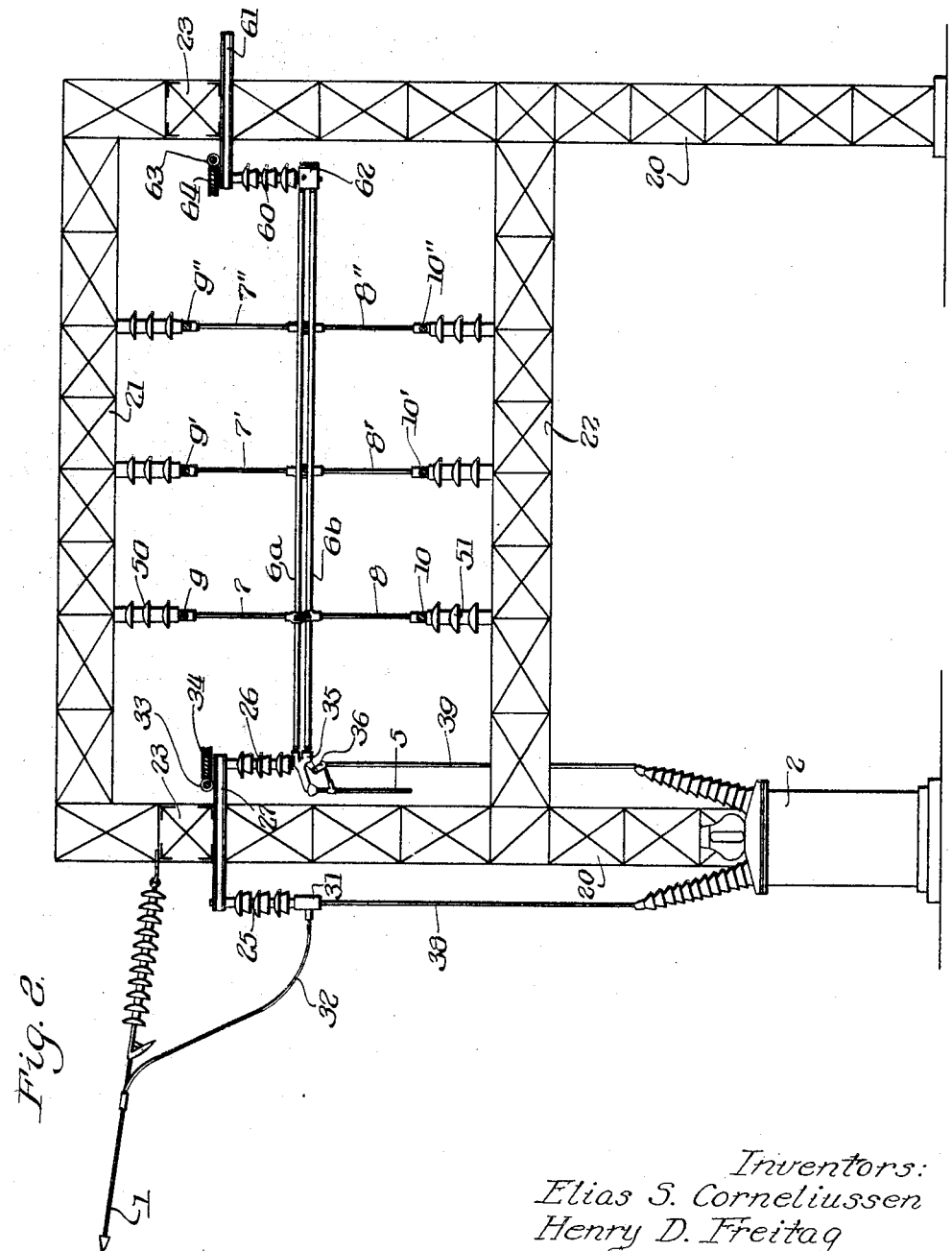

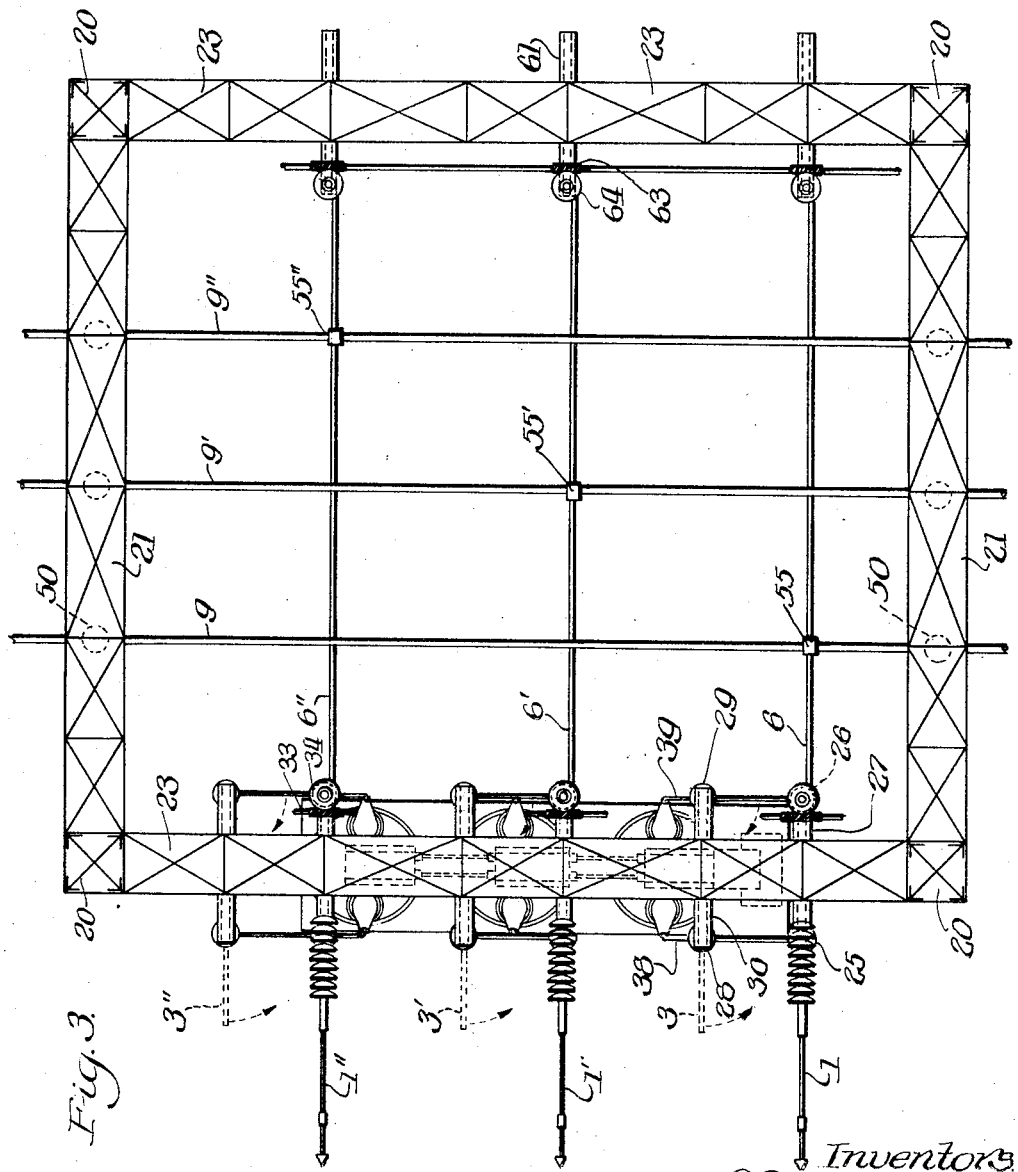

Patented Oct. 25, 1932

1,884,579

UNITED STATES PATENT OFFICE

ELIAS S. CORNELIUSSEN, CALLED CORNELL, OF CHICAGO, ILLINOIS, HENRY D. FREITAG, OF LYNBROOK, AND PHILIP SPORN, OF MANHATTAN BEACH, NEW YORK; SAID CORNELIUSSEN ASSIGNOR TO THE DELTA STAR ELECTRIC COMPANY, OF CHICAGO, ILLINOIS, A CORPORATION OF ILLINOIS

ELECTRIC STATION

Application filed December 19, 1928. Serial No. 326,928.

This invention relates to electric stations, and it is an object of this invention to provide novel and improved power connections and switching means at the station for controlling the distribution of power at the station.

It is a more particular object of this invention to provide a transfer system wherein the power may be transmitted over a main bus or over an auxiliary bus, the transfer from one bus to the other involving the use of a minimum number of oil circuit breakers and insulators.

It is a further object of this invention to provide a switching system of an electric power plant which will be economical in construction, and which will be safe and certain in its operation.

While the system here disclosed is particularly useful in high voltage stations its use is not limited thereto. The attainment of the above and further objects of the invention will be apparent from the following specification taken in conjunction with the accompanying drawings forming a part thereof.

In the drawings:

Fig. 1 is a schematic single line diagram showing our novel switching system;

Fig. 2 is a front view of the switching station;

Fig. 3 is a top view of the switching station; and

Fig. 4 is a side view thereof.

Referring now more particularly to Fig. 1 of the drawings, 1 indicates a power line which may be either incoming or outgoing. The power line may be connected by way of an oil switch 2 and disconnect switches 3 and 4 to a rotatable line bus 6, or by means of a disconnect switch 5 the line may be directly connected to the bus without the use of the oil circuit breaker.

The rotatable line bus 6 carries two switch arms 7 and 8 whereby connections may be established between the rotatable bus 6 and either the main bus 9 or the auxiliary bus 10. It is to be noted that the disconnect switches 7 and 8 are not rigid with respect to one another and it is, therefore, possible to have the line 1 connected to both busses 9 and 10 at the same time. This is of particular importance for, with such an arrangement, it is not necessary to interrupt the current flow over the line upon changing from the main bus 9 to the auxiliary or reserve bus 10, or vice versa. When the disconnect switch 7 is closed and the bus 9 thereby connected to the bus 6, the auxiliary bus may be brought into service by first closing the disconnect switch 8 and then opening the disconnect switch 7. In the ordinary operation of the system, the disconnect switch 5 is open and the switches 3 and 4 closed thereby connecting the oil circuit breaker 2 in the circuit. Should it be desirable to remove the circuit breaker from the circuit for inspection or repair purposes, then the switch 5 is first closed thereby short circuiting the breaker 2, and thereafter the switches 3 and 4 are opened, thereby isolating the breaker from the line. To reconnect the circuit breaker in the circuit the switches 3 and 4 are first closed and then the switch 5 is opened. By this arrangement it is apparent that at no time is it necessary for the switches 3, 4 or 5 to interrupt a heavy current flow, for, when the switches 3 and 4 are opened to disconnect the circuit breaker from the line, the switch 5 is already closed thereby by-passing the current that previously flowed through the circuit breaker.

It is apparent that the same is true when the switch 5 is opened at a time when the switches 3 and 4 are closed, for at such time the current that must be interrupted upon the opening of the switch 5 is merely the current that flows as a result of the small voltage drop through the circuit breaker, which voltage drop is negligible.

While Fig. 1 shows a line diagram for one phase only, it is understood that similar connections are provided for each of the other phases and that in a three phase system there are three such circuits.

Reference may now be made to Figures 2, 3 and 4 showing the physical layout of the busses, the oil circuit breakers, and the disconnect switches. The bus supporting structure comprises a trussed steel tower which, insofar as the present invention is concerned, may be of any preferred construction. In general, the tower comprises the four vertical supporting members 20 interconnected by two sets of horizontal members 21—22 extending in one direction, and a set of trussed members 23 extending in the other direction. Insulator stacks 25—26 are suspended from a cross member 27 which is secured to the truss 23, and insulator stacks 28—29 are similarly suspended from a cross member 30 also mounted on the truss member 23.

The blade of the disconnect switch 3 is mounted at the bottom of the insulator stack 28, whereas the blade of the disconnect switch 4 is mounted at the bottom of the rotatable insulator stack 29. The insulator stack 26 supports the switch blade 5 and further provides a stationary bearing for the line bus 6, as will be presently described. The insulator stack 25 is stationary and supports a contact 31 which may be engaged by either the blade 5 or the blade 3. The stack 25 further acts as a support for the lead-in wire 32 extending from the line 1 to the terminal contact 31. The insulator stack 26 may be rotated in any suitable manner. In the embodiment of the invention here illustrated the stack 26 is rotated by means of a worm 33 and a worm wheel 34, but, since the particular type of switch used forms no part of the present invention, it is understood that the insulator stack 26 may be rotated in any other desired manner. Mounted at the bottom of the insulator stack 26 is a bracket member 35. The bracket member 35 is secured to the insulator stack 26 by means of a suitable bearing so that although the stack 26 rotates, the bracket 35 remains stationary. Upon rotation of the insulator stack 26 the link work represented at 36 is actuated to move the switch blade 5 into and out of engagement with the contact 31. Upon rotating the insulator stack 28, the switch blade 3 is moved into and out of electrical engagement with the contact 31.

The insulator stack 26 supports a suitable stationary contact (not shown) which is electrically connected to the switch blade 5 and which is engaged by the switch blade 4 as the blade is swung into the closed position upon the rotation of the insulator stack 29. The oil circuit breaker 2 is connected by means of conductors 38 and 39 to the switch blade 3 and the switch blade 4, respectively. The bus 6 comprises two rotatable bus members 6a and 6b electrically connected together in any desired manner so as to form one bus, and mechanically arranged to be independently rotatable with respect to one another. The stationary bracket 35 provides a bearing support for the rotatable bus members 6a and 6b.

From the description of the switching structure thus far given, it is apparent that a circuit may be established between the line 1 and the bus 6 over either of two paths as follows: With the switch 5 open and the switches 3 and 4 closed the circuit extends from the line 1, conductor 32 and contact 31 to the switch blade 3, thence by way of the conductor 38, through the oil circuit breaker 2 and conductor 39 to the switch blade 4 and thence to the rotatable bus 6. The other circuit from the line 1 to the bus 6 is established when the switch 5 is closed and the switches 3 and 4 are open and extends from the line 1 and conductor 32 to the contact 31, and thence by way of the switch blade 5 to the rotatable bus 6.

The switches 3 and 4 are preferably arranged for operation in unison and are operable independent of the operation of the switch 5.

It is apparent from the arrangement shown, that when the switches 3 and 4 are open the oil circuit breaker 2 is entirely isolated from the line, thereby permitting the inspection or repair of the circuit breaker with safety.

The main bus 9 is suspended from the truss member 21 by suitable insulators 50, whereas the auxiliary bus 10 is mounted on the truss member 22 by suitable insulators 51. The busses 9 and 10 extend parallel to one another and at right angles to the bus 6. The switch blades 7 and 8 are mounted upon the bus rods 6a and 6b, respectively, and are each rotatable with its bus rod. The main bus 9 has a collar 55 clamped thereto, and to said collar is pivoted a contact 56. A similar collar 57 and contact 58 is provided upon the auxiliary or transfer bus 10. Upon rotation of the bus rods 6a and 6b the switch blades 7 and 8 are rotated into and out of engagement with the respective contacts 56 and 58. The switch blades 7 and 8 are arranged with respect to one another and with respect to their contacts 56 and 58 so that if the switch 7 is in engagement with its contact and both of the bus rods 6a and 6b are rotated to bring the blade 8 into engagement with its contact, the blade 8 will engage the contact 58 before the blade 7 leaves the contact 56.

The same is true when the blade 8 is being swung out of engagement with its contact and the blade 7 is being swung into engagement with its contact. As a result of this arrangement the bus 10 is brought into service before the bus 9 is disconnected from service, thereby providing continuous service and also permitting the use of disconnect switches 7 and 8 rather than expensive oil circuit breakers. This is so for at the time either of the switch blades is leaving its contact the other blade is already in engagement with its contact thereby providing a different path for the current flowing through the bus bar 6 and avoiding the necessity of interrupting a large current flow. It is, of course, understood that by continued rotation of the bus rods 6a and 6b both of the switch blades 7 and 8 may be swung out of engagement with their contacts, thereby disconnecting the bus bar 6 from both the main bus 9 and from the transfer bus 10. It is, however, understood that the operator would never swing the bus 6 to disconnect both the switch 7 and the switch 8 unless, previous to that time, the bus 6 had been disconnected from the circuit at the circuit breaker, such as 2.

As previously stated, the bus rods 6a and 6b are supported at one end in a suitable bearing mounted on the bracket 35. Suitable supporting and operating means for the bus 6 is provided at the other end of the truss structure.

An insulator stack 60 supported by a member 61 which is secured to the truss member 23, supports a bracket 62. The insulator stack 60 may be rotated in any desired manner as by means of a worm 63 and a worm wheel 64. The bracket 62 is secured to the lower end of the rotatable insulator 60 by means of suitable bearings so as to permit the bracket 62 to remain stationary when the insulator stack 60 is rotated. The bracket housing 62 provides a bearing for the bus rods 6a and 6b. Suitable gears are mounted in the housing 62 which gears rotate the bus rods 6a and 6b upon the rotation of the insulator stack 60. Upon rotating the worm 63 in any suitable manner, the insulator stack 60 is rotated thereby rotating the bus rods 6a and 6b to swing the switch blades 7 and 8 into and out of engagement with their respective contacts.

While the description thus far given has been limited to the switching arrangement for one phase only, it is understood that a similar mechanical arrangement is provided for each of the other phases. Figures 2, 3 and 4 show the switching arrangement for a three phase system. The two remaining lines of the three phase system are indicated at 1' and 1'', respectively. The rotatable busses of all three phases are preferably, although not necessarily, gang operated, being operated by the common worm shaft 63.

The busses 6' and 6'' are provided with switches 7' and 7'', respectively, and 8' and 8'', respectively, for establishing connections, similar to those previously described, with the busses 9' and 9'', respectively, and with the busses 10' and 10'',respectively. The contact for the blades of the switch 7' is mounted on the bus 6' at a point indicated at 55' in Fig. 3, whereas those of the blade 7'' are located as indicated at 55'' of Fig. 3. The location of the disconnect switches 3' and 3'' and of the oil circuit breakers 2' and 2'' may be clearly seen from Fig. 3. Since the switching arrangement for the phases 1' and 1'' is the same as that previously described in connection with the phase 1, it is believed that a further description is unnecessary.

While we have shown the line 1 as constituting an incoming transmission line, it is, of course, understood that the invention is not limited thereto. The feeder connections to the busses 9 and 10 are similar to the transmission line connections, a rotatable bus, identical to the bus 6 being used, and the line 1 may be considered as a feeder, if so desired.

In compliance with the requirements of the patent statutes we have herein shown and described a preferred embodiment of our invention. It is, however, to be understood that our invention is not limited to the precise embodiment here shown, the same being merely illustrative of the invention. What we consider new and desire to secure by Letters Patent is:

1. In an electric power system, a main bus, a transfer bus, a rotatable bus between said main and transfer busses, and separate switching means carried by the rotatable bus and separately actuated for establishing an electric connection between the rotatable bus and either of the other busses.

2. In an electric power system, two spaced busses, an axially rotatable bus between them, switch contacts carried by each of the two first mentioned busses, and means carried by the rotatable bus cooperating with said contacts to establish a circuit between the third bus and either of the two first mentioned busses.

3. In a polyphase electric power system, two polyphase busses, a polyphase movable bus, and switching means directly mounted on the receptive phase conductors of the movable bus and actuated by the movement of the movable bus for electrically connecting the movable bus to either of the two first mentioned busses.

4. In an electric system, means for transferring a power connection from a main to a transfer bus, said means comprising a movable bus, switching means mounted on the movable bus and movable therewith, and means directly mounted respectively on the main bus and on the transfer bus engageable by the switching means for completing an electric connection between the movable bus and either of the other busses.

5. In an electric power system, two spaced parallel conductors, a third conductor extending between the two conductors, said third conductor being movable, switching means mounted on the third conductor, and cooperating switching means mounted on each of the other two conductors whereby a circuit may be selectively established between the movable conductor and either of the two first mentioned conductors.

6. In an electric power system, a main bus and a transfer bus parallel to and spaced from one another, a rotatable bus at right angles thereto and spaced intermediate of the two first mentioned busses, means for rotating the rotatable bus, and switching means carried by the rotatable bus for establishing a circuit between the rotatable bus and either the main or transfer bus upon the rotation of the rotatable bus.

7. In a polyphase electric power system, three sets of busses arranged in three parallel planes, each set comprising one bus for each phase, the busses in the two end planes being parallel to one another and the busses in the intermediate plane being at right angles to the other busses, said last mentioned busses being movable, and means effective upon the movement of those busses to selectively establish a circuit between each of those busses and the corresponding bus of its phase in either of the other two sets of busses.

8. In a polyphase power system, a main bus and a transfer bus for each phase, all of the busses being parallel to one another, the main busses being in one plane and the transfer busses in another plane, a third set of busses, one for each phase, said last mentioned busses being at right angles to the first mentioned busses and in a plane parallel to and spaced between the planes of the main and the transfer busses, and means mounted on each of the busses of the third set for selectively connecting each of said busses to the main or to the transfer bus of its phase.

9. An electric system including a first bus, switching means mounted thereon, a second and a third bus, switching members mounted on each of the last mentioned busses, and means for selectively operating the switching means on the first bus to selectively engage either of the switching members.

10. An electric system including a first polyphase bus, a second polyphase bus, cooperating switching means on corresponding phase conductors of both busses, a third polyphase bus, cooperating switching means on the corresponding phase conductors of the second and the third bus, and means for selectively operating the first or the second set of cooperating switching means into and out of engagement with one another.

11. In an electric system, two polyphase busses all of the phase conductors of which are parallel to one another with the respective phase conductors of one bus lying in one plane and the respective phase conductors of the other bus lying in one plane, a third bus the respective phase conductors of which are at right angles to the first mentioned phase conductors and spaced therefrom, and switching means mechanically mounted directly on the busses for establishing connections between corresponding phase conductors of either of the two first mentioned busses and the third bus.

12. A polyphase switching station comprising three sets of polyphase busses located in three adjacent planes, and switching means mounted directly on the respective phase conductors of the busses for establishing connections between corresponding phase conductors of the busses.

13. In an electric power system, two busses, a movable bus, switching means actuated upon the movement of the movable bus for connecting the movable bus to either of the two other busses, a power line, a circuit breaker, disconnect switches for connecting the two sides of the circuit breaker to the line and to the movable bus respectively, and an additional switching means for connecting the line to the movable bus independently of the disconnect switches.

14. In an electric system, a bus structure comprising two parallel mechanically and electrically connected members, and means for independently rotating the two members.

15. In a switching station, three parallel side by side busses, three additional busses parallel to and spaced from the first mentioned busses, three movable switching busses disposed between said two sets of busses, each of the switching busses comprising two separately movable parallel bars, said switching busses extending at right angles to the other busses, and switch blades carried by said switching busses and movable into and out of engagement with the other busses.

In witness whereof, I hereunto subscribe my name this 26th day of November, 1928.
ELIAS S. CORNELIUSSEN.

In witness whereof, I hereunto subscribe my name this 5th day of December, 1928.
HENRY D. FREITAG.

In witness whereof, I hereunto subscribe my name this 13th day of December, 1928.
PHILIP SPORN.